Figure 7:
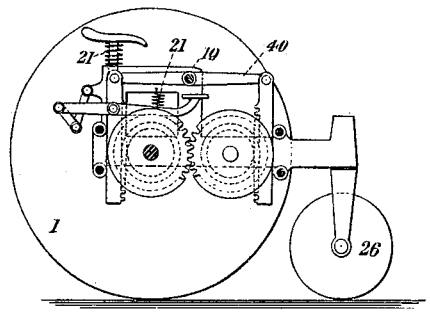

(No Model.) 2 Sheets—Sheet 1.
H. BAINES.
VELOCIPEDE.
No. 351,150. Patented Oct. 19, 1886.
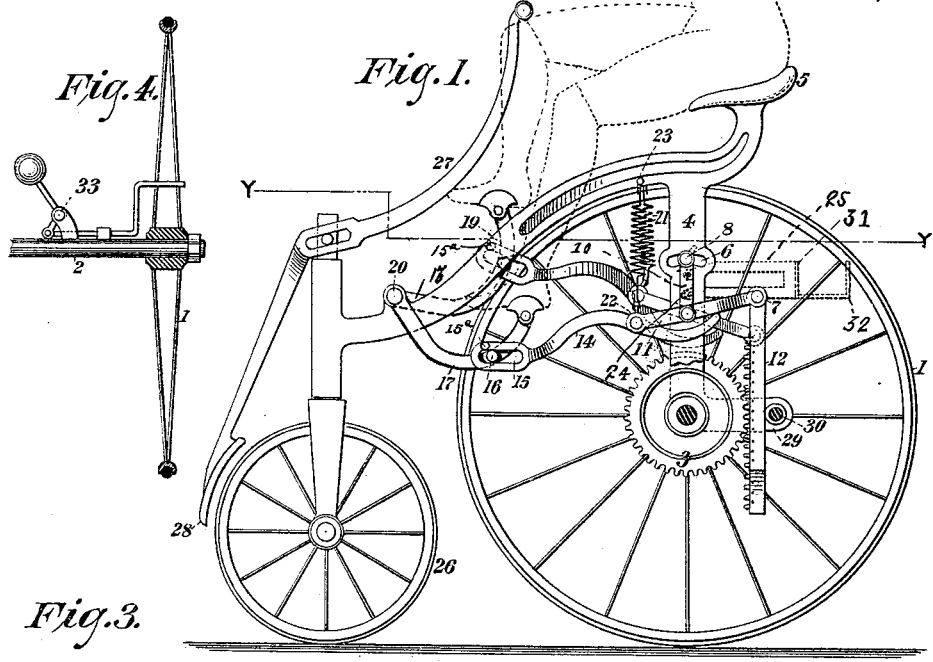
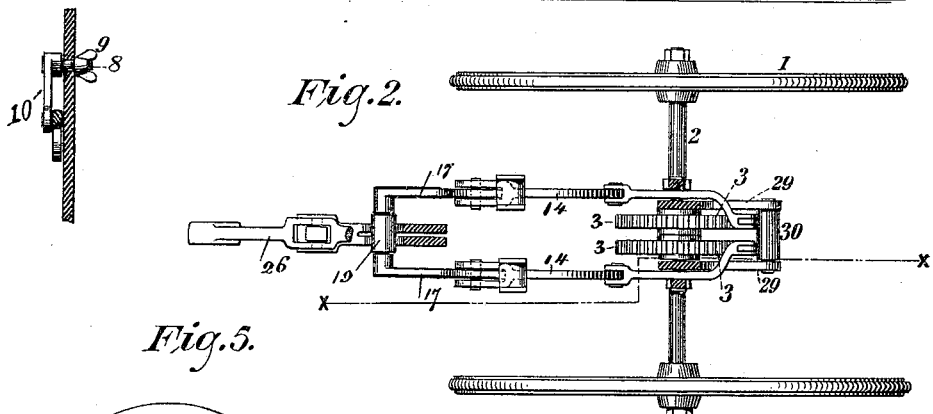
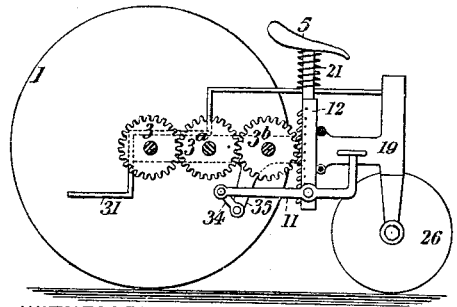
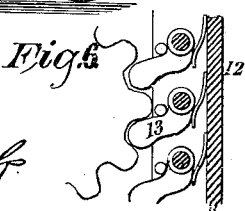
WITNESSES:
Gustuveh Dieterich
Geo. L. Wheelock
INVENTOR
Hugh Baines,
BY Knight Bros
ATTORNEYS.
N. PETERS, Photo-Lithographer, Washington, D. C.

(No Model.)  2 Sheets—Sheet 2.

H. BAINES.
VELOCIPEDE.

No. 351,150.  Patented Oct. 19, 1886.

WITNESSES:
Gustave Dieterich
Geo. L. Wheelock

INVENTOR
Hugh Baines,
BY
Knight Bros
ATTORNEYS.

United States Patent Office.

HUGH BAINES, OF TORONTO, ONTARIO, CANADA.

VELOCIPEDE.

SPECIFICATION forming part of Letters Patent No. 351,150, dated October 19, 1886.

Application filed April 4, 1885. Serial No. 161,193. (No model.) Patented in England May 12, 1885, No. 5,827; in France May 12, 1885, No. 168,887; in Belgium May 12, 1885, No. 68,847; in Germany May 12, 1885, No. 34,432, and in Italy May 15, 1885, No. 18,346.

*To all whom it may concern:*

Be it known that I, HUGH BAINES, a citizen of Canada, and a resident of Toronto, have invented certain new and useful Improvements in Tricycles, Bicycles, and other Vehicles, of which the following is a specification.

My invention relates to a new and improved method of propelling vehicles, &c.; and it consists in applying the power to the driving wheel or wheels through the medium of racks having movable teeth—that is to say, the teeth of the gearing when in position and moving in a certain direction will intermesh with and operate any other rack or pinion, but when the motion is reversed the teeth will fall back and become inoperative until the beginning of the direct or return stroke, when they will again, and automatically, resume an operative position.

The preferred form of my invention consists of a tricycle or three-wheeled vehicle having in the front a small guiding or steering wheel swiveled and turning vertically in the forward part of the frame or backbone of the vehicle. A brake and guiding-bar are provided at this point for the convenience of the rider. Behind this is situated the main driving-wheels. The driving-axle, to which one or both of the aforesaid wheels may be rigidly attached, is provided with two cog or milled wheels keyed or otherwise tightly attached to the driving-axle. The supporting-post extends vertically upward from the axle, and is provided with a transverse or horizontal slot, in which is set a swinging lever or levers. These levers may be adjusted relatively to the length of the vehicle, thereby shifting the stress of the leverage fore or aft, as may be desired. Attached to this adjustable swinging link is an arrangement for accommodating an additional load upon the vehicle, and by shifting the said link back or forth relatively to the slot the additional weight or load is balanced over the driving-axle, so as to always throw the entire weight of the load and vehicle on said driving-axle for the purpose of more fully utilizing said weight for tractional purposes. Pivoted to the lower ends of these swinging links are other levers, which extend forward and rearward, the rear ends being connected and pivoted to vertically-moving racks, said racks being provided with movable teeth, which gear with and operate the cog-wheels, before referred to. This intermeshing of the racks with the cog-wheels causes the latter to revolve when said racks are moved, thereby turning the driving-axle and propelling the machine. The forward ends of the horizontal levers are connected and pivoted to other levers having horizontal slots, in which move back and forth the lugs or pins of the foot-rest or stirrup-levers. The aforesaid slotted levers also extend rearwardly of their pivotal points, and impinge against the lower edge of the horizontal levers attached to the swinging links. Springs, attached to the frame of the vehicle, extend downward, and are connected to the levers for withdrawing them when the pressure upon them is removed. The forward ends of the foot-levers are pivoted to a common point on the main frame or backbone of the vehicle.

Figure 8:
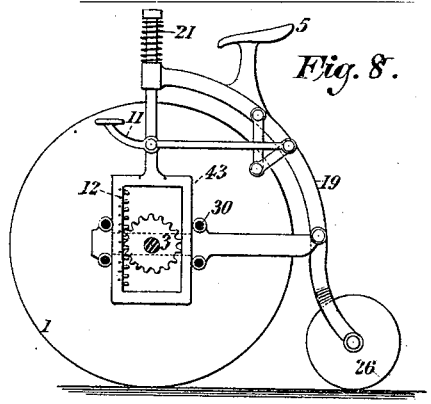
Figure 9:
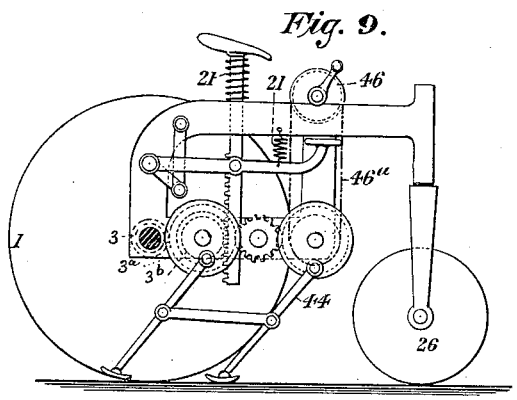

Referring to the accompanying drawings, which form a part of this specification, Figure 1 is a side elevation of the preferred form of my invention. Fig. 2 is a plan view of the same. Fig. 3 is a cross-section of a detail view of the adjustable fulcrum device. Fig. 4 is a view of a clutch mechanism for throwing the wheel, which is loosely mounted on the driving-axle, into or out of connection. Fig. 5 represents a modification of my device. Fig. 6 is a detail view of the rack and pinion, the rack being provided with movable teeth. Figs. 7 to 9, inclusive, show various methods of embodying my invention in different vehicles.

Referring to Figs. 1 and 2, 1 represents the driving-wheels mounted on an axle, 2. Rigidly attached to the axle 2 are cog or ratchet wheels 3, and extending upwardly from the axle are supporting-pieces 4. A seat, 5, rests upon the top of these supports. This seat may be adjustable, if desired. At a point, 6, on these standards 4 are slots 7. These slots are slightly curved, and constitute an arc or portion of a circle. This is their preferred form.

Within the slots 7 rest pins or pivots 8, which may be moved back and forth in the slots, and secured in any desired position by means of a thumb-screw, 9. Attached to these pins 8 are swinging links 10, suspended from them. To the lower ends of the swinging links 10 are pivoted horizontal levers 11, which extend forward and rearward, the rear ends being attached and pivoted to the vertically-moving racks 12. These latter are provided with movable teeth 13, as shown in detail in Fig. 6. While the rack is moving in one direction the teeth will engage with the teeth of the cog-wheel, thus operating it. While moving in the other direction the movable teeth will slide freely over the wheel. This construction may be reversed, and the movable teeth may be placed upon the wheel and the rigid teeth upon the rack. At the forward ends of the horizontal levers 11, I pivot other levers, 14, which extend rearwardly and bear against the lower edges of the levers 11. The levers 14 are provided with horizontal slots 15, in which move pins or lugs 16 of the foot-rest or stirrup levers 17. These latter are hung from the main frame or backbone 19 of the vehicle at a common point, 20. Springs 21 are provided, which connect the levers and the frame 22 and 23, respectively, for the purpose of retracting the said levers after the pressure upon them has been removed. Extending rearwardly from the axle are rigidly-attached arms 29, from the ends of which is hung and journaled a roller, 30, to limit the longitudinal movement of the vertically-sliding racks 12. At 26 is a guide-wheel, and 27 a guiding-handle controlling the direction of the wheel 26 and the position and application of the brake-shoe 28. In connection with this vehicle I also arrange a supplementary seat or seats, 31, or a box or casing, 32, for holding and transporting one or more additional persons besides the operator. This box or casing may also be employed for carrying merchandise. It is illustrated in Fig. 1 in dotted lines, and is attached in any suitable manner to the swinging links 10, as by arms 25, connected through openings 24 in the swinging link. Any additional amount of weight in the shape either of passengers or merchandise may be placed in this car, limited only by the strength of the vehicle, as the swinging link 10 may be moved forward in the slot 7 as far as the additional load requires, thereby balancing and centering all the weight directly over the driving-axle. As before stated, one of the driving-wheels is rigidly attached to the driving-axle, while the other may or may not be rigidly attached.

In Fig. 4 I show one of the driving-wheels turning loosely on the axle and provided with a clutch mechanism, 33, which is within easy access of the rider, whereby the wheel may be thrown in or out of rigid connection with the axle at any time. This arrangement becomes necessary for the better manipulation of the vehicle when turning curves. I may substitute for this clutch, however, any other suitable arrangement.

In Fig. 5 the vertically-moving rack 12, having movable teeth, as shown, gears with cog-wheel $3^b$, which intermeshes with and rotates the wheel $3^a$, and it in turn operates the cog-wheel 3 on the driving-axle. The horizontal levers 11 in this case are pivoted to links 34, which are in turn swiveled to arms 35, suspended from the main frame. The seat 31 is arranged in connection with this form of vehicle. In fact, I only contemplate employing this arrangement where additional passengers or merchandise will always have to be carried.

In Fig. 7 the vertically-moving racks having movable teeth are placed at different sides of the driving-axle, and an oscillating beam, 40, connects said racks and is pivoted to the frame 19, and serves to utilize the reciprocating movement. The power is transmitted to the driving-axle through the medium of the racks and pinions and compound levers operated by the body or the feet.

In Fig. 8 I show a bicycle form. This arrangement is especially adapted for a two-wheeled vehicle. A square-shaped frame, 43, is shown, which carries the vertically-moving rack-bars 12, having movable teeth which gear with and operate the pinion on the driving-axle.

In Fig. 9 these bars 44 are introduced and are connected to the rotating parts for propelling the vehicle. Here the racks 12, having movable teeth and pinions 3, are also employed. I also show in this connection a device, 46, for utilizing the hands as a means of propulsion. An endless chain, $46^a$, moves around the wheels 46, the lower of these wheels being connected to the cog wheel or wheels 3. In this form the vertically-moving racks 12, having movable teeth, gear with and operate a small cog-wheel, $3^b$, which is connected to a larger cog-wheel, $3^a$, and this intermeshes with the cog-wheel 3, keyed to the driving-axle. Though I have shown this mechanism in front of the driving-axle, it may be arranged in the rear without departing from the principle therein shown.

In all these forms, the springs 21 I show and employ for withdrawing and resetting the levers after the pressure has been removed, it is to be understood are of sufficient strength to not only lift and replace the said levers, but also to lift the dead-weight of the operator's legs when said operator or rider is not pressing down upon that certain series of levers.

Having thus described my invention, what I claim as new therein, and desire to secure by Letters Patent, is—

1. In a tricycle or other vehicle, the combination of the driving wheel or wheels, the pinion gearing upon the axle or axles of the wheel or wheels, the rack or racks provided with movable teeth, and the operating-levers, as shown and described.

2. In a tricycle or other vehicle, the combination of the vehicle-frame, the operating lever or levers fulcrumed or swiveled adjustably within the frame, the rack or racks having movable teeth, the driving wheel or wheels, and the pinion gearing on the axle or axles of the said driving wheel or wheels, which gear with and are operated by the movable-teeth racks.

HUGH BAINES.

Witnesses:
   THO. MATTHEWS,
   P. B. MATTHEWS.